March 6, 1934.  A. G. HEGGEM  1,949,834
VALVE
Filed May 8, 1931  7 Sheets-Sheet 1

INVENTOR
Alfred G. Heggem
BY Ritter & Ritter
his ATTORNEYS

March 6, 1934.  A. G. HEGGEM  1,949,834
VALVE
Filed May 8, 1931   7 Sheets-Sheet 2

March 6, 1934.  A. G. HEGGEM  1,949,834

VALVE

Filed May 8, 1931  7 Sheets-Sheet 3

INVENTOR
Alfred G. Heggem
BY
his ATTORNEYS

March 6, 1934.   A. G. HEGGEM   1,949,834
VALVE
Filed May 8, 1931   7 Sheets-Sheet 6

INVENTOR
Alfred G. Heggem
BY Ritter & Ritter
his ATTORNEYS

March 6, 1934.  A. G. HEGGEM  1,949,834
VALVE
Filed May 8, 1931  7 Sheets-Sheet 7

INVENTOR
Alfred G. Heggem
BY
ATTORNEYS

Patented Mar. 6, 1934

1,949,834

UNITED STATES PATENT OFFICE 1,949,834

VALVE

Alfred G. Heggem, Tulsa, Okla.

Application May 8, 1931, Serial No. 535,991

25 Claims. (Cl. 251—102)

My invention relates to valves and is especially designed to provide a structure suited for valves of large size that are adapted to withstand high-pressures such as often occur in oil and gas valves.

The primary objects of the invention are to provide a valve which, when closed, efficiently resists the passage of fluid therethrough, which may be readily seated firmly in closed position, which is so constructed that the possibility of solids lodging in the valve and interfering with its operation is practically eliminated, and in which the parts are so formed and related that slight irregularities in construction do not detrimentally affect the operation of the device to any substantial extent.

The principal feature of the invention consists in constructing the valve with a body member formed with a valve receiving chamber which is in communication with an inlet opening and an outlet opening affording passage of fluid through the valve, and in combining with said body a valve plug upon which oppositely disposed valve plates are movably mounted, the valve plates being respectively adapted to seal the inlet and outlet openings of the valve body and the valve plug having an opening therethrough which is in axial alinement with said openings of the valve body when the valve is open, means being provided for forcing the valve plates into sealing contact with the valve body, said means including a plurality of levers pivotally mounted on the valve plug and respectively cooperating with the valve plates, and means for simultaneously actuating said levers.

A further feature of the invention consists in employing levers for forcing the valve plates to closed position and in combining therewith toggle mechanism for actuating the levers, the toggle mechanism being controlled by a rotatable stem or shaft.

A still further feature of the invention consists in actuating the valve plates carried by the valve plug through the instrumentality of means including a rotatable valve stem, and in providing an automatically acting detent device for releasably coupling the valve plug to the stem.

Still another feature of the invention consists in so forming and relating the valve plates and the levers or beams by which they are actuated that the plates are not only positively forced to valve closing position but are positively retracted from their seats on the valve body during the operation of opening the valve.

Other features of the invention residing in advantageous forms and relations of parts will hereinafter appear.

In the drawings illustrating preferred embodiments of the invention.

The valve body 1 is formed with a circularly curved chamber 2 opening from which are passages 3 for the inflow and outflow of the fluid to be controlled by the valve. These passages are preferably disposed in axial alinement and they may be interiorly threaded to permit the valve to be screwed on to the casing of a well, as the valve is especially adapted to permit bits and tools used in well drilling to be operated through it. While the valve is especially useful when used in association with a well drilling rig, it is to be understood that it is capable of use in other relations. It is also to be understood that when employed in conjunction with the casing of a well its mode of connection to such casing or piping may be varied as desired.

The valve plug or core 4 which is rotatably mounted in the chamber 2 of the valve body is of cylindrical form and has a transverse passage 5 therethrough of a diameter corresponding to that of the openings 3 in the valve body. It is turned on the outside to an approximate fit which is preferably such as to permit the core to turn within the body without peripheral rubbing contact therewith. At one end the core is supported centrally in the body by the bearing bushing 6 with which the trunnion 7 of the body is preferably provided and it is supported centrally at the other end by the valve stem bushing 8 which is encircled by the core cover 9, the latter being rigidly secured to the core 4 by means of screws 10 which pass through the cover and enter threaded openings 11 in the core. The bearings 6 and 8 are preferably of bronze but, if employed, may be of any suitable metal.

At ninety degrees to the axis of this fluid passageway 5 the core 4 is exteriorly provided with two cylindrical recesses 12 into which the corresponding valve plates 13 fit. The valve plates are curved to conform to the cylindrical recesses 12 and the outer face of each is cylindrically curved to correspond to the bore of the valve body 1. Extending parallel to the axis of the plug or core 4, each valve plate 13 is provided with a T-shaped slot 14 for receiving a lever or beam 15, the said levers being respectively pivoted to the core 4 by means of pivot pins 16 extending through perforated lugs 17 formed on the interior of the core and between which the correspondingly adjacent levers 15 are received. At the approximate center of each of the valve plates the slots 14 are somewhat constricted to provide close fitting contact with the valve beams 15 which yet permits the beams to rock slightly with respect to the valve plates. As shown in the drawings, the constriction of the slot 14 in each valve plate is preferably accomplished by forming a rearwardly facing cylindrically curved projection or lug 18 on the valve plate at the center thereof, the axis of curvature of the lug extending transversely with respect to the axis of the core.

When the valve plates 13 are being forced radially outward to seat on the valve body in closed position the curved projections 18 form bearings upon which the respectively adjacent levers 15 may rock. To provide for a similar rocking of the levers or beams 15 with respect to the valve plates when the latter are being retracted from closed position the levers, which are widened between their ends, are preferably formed with rearwardly facing cylindrically curved lugs 19 which are adapted to engage and cooperate with adjacent portions 20 of the rear walls of the slots 14 in the valve plates.

Each of the levers or valve beams 15 is pivotally connected at its outer end to a link member 21 by means of a pin 22, the link members being in turn respectively pivoted to a valve nut 23 by means of pins 24, and the valve nut being provided with spaced perforated lugs for receiving the correspondingly perforated lugs of the links. The valve nut 23 engages threads 25 formed on the valve stem 26 near its inner end, the threads being preferably left hand so as to cause the nut 23 to travel inwardly when the valve stem rotates clockwise. The inner end of the valve stem is preferably seated in a bearing 27 carried by the valve plug 4, while on the outer end of the stem is mounted an operating handwheel 28.

Keyed or otherwise rigidly secured to the valve stem 26 so as to rotate therewith is a lock disk 29 which is interposed between the valve core cover 9 and the valve nut 23. This lock disk is provided on its periphery with a recess 30 adapted to receive the inner end of a detent 31 slidably mounted on the core 4 and core cover 9. The outer end of the detent is adapted to project into a recess 32 on the interior of the valve body 1. The lock disk 29 is also provided on its under side with a stop lug 33 which is so located as to engage the valve nut 23 when the valve stem 26 has made a sufficient number of revolutions in the proper direction to bring the nut within striking distance of the lug. The lug projects from the under side of the lock disk to an extent such that it will miss the valve nut 23 on the reverse rotation of the valve stem. When the lug 33 contacts with the nut the recess 30 in the periphery of the lock disk 29 is in alinement with the detent 31 so as to enable the inner end of the latter to move into it.

In addition to the stop lug 33 for cooperating with the valve nut 23, the valve is also provided with stop means for limiting the rotation of the core 4 within the body 1 so as to insure that the core shall properly assume open and closed positions. This stop means preferably comprises two stops 34 and 35 respectively formed on the valve body 1 for cooperating with a single stop 36 formed on the inner end of the valve core 4, the stops 34 and 35 being so positioned as to limit the rotation of the valve core to a quarter turn, which is the extent of rotation of the valve core 4 necessary to bring it from open to closed position or vice versa. The stops 34 and 35 on the interior of the valve body 1 may be conveniently formed as the end faces of a segmental flange 37 which extends into a circularly curved groove or channel 38 in the inner end of the core 4.

The opening in the valve body 1 through which the valve core 4 and associated parts are introduced is closed by a cover flange member 39 which is removably secured to the valve body by threaded studs 40 and cooperating nuts. The cover 39 through which the valve stem 26 extends is provided with a packing chamber 41 to receive packing 42 for preventing the escape of fluid. The packing is compressed within the packing chamber by means of a packing gland 43 and a gland cover 44 cooperating therewith. The gland cover is preferably adjustably connected to the cover flange 39 of the valve body by bolts 45 which extend through radially opening slots in the valve cover. By forming the gland cover 44 separate from the gland 43 the possibility of unequal adjustment of the gland bolts 45 causing the gland to bind upon the valve stem 26 is avoided.

To enable the valve core and parts associated therewith to be maintained in a bath of lubricant a grease cup or grease gun connection 46 extending axially inward through the valve body and opening into a transverse lubricant passage 47 may be employed. The passage 47 opens at its opposite ends into the valve plate receiving recesses 12 of the valve core 4.

Figure 27:
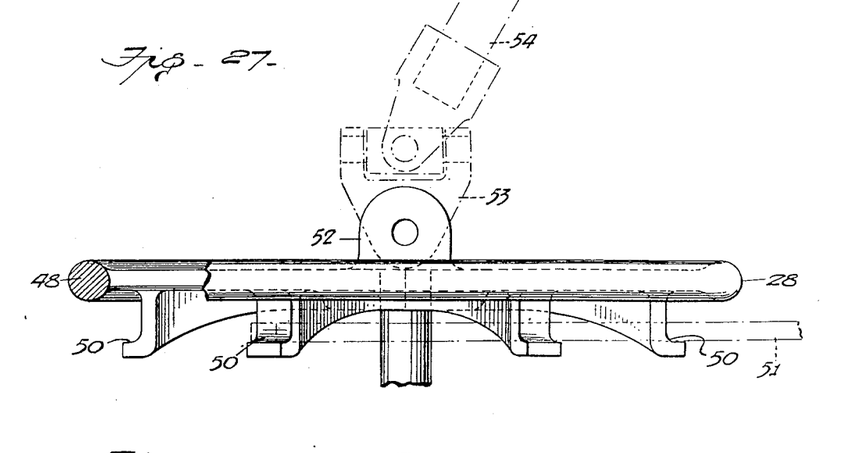
Figure 27 is an elevational view of the handwheel for operating the stem of the valve, showing also in dotted lines means for operating the handwheel.
Figure 28:
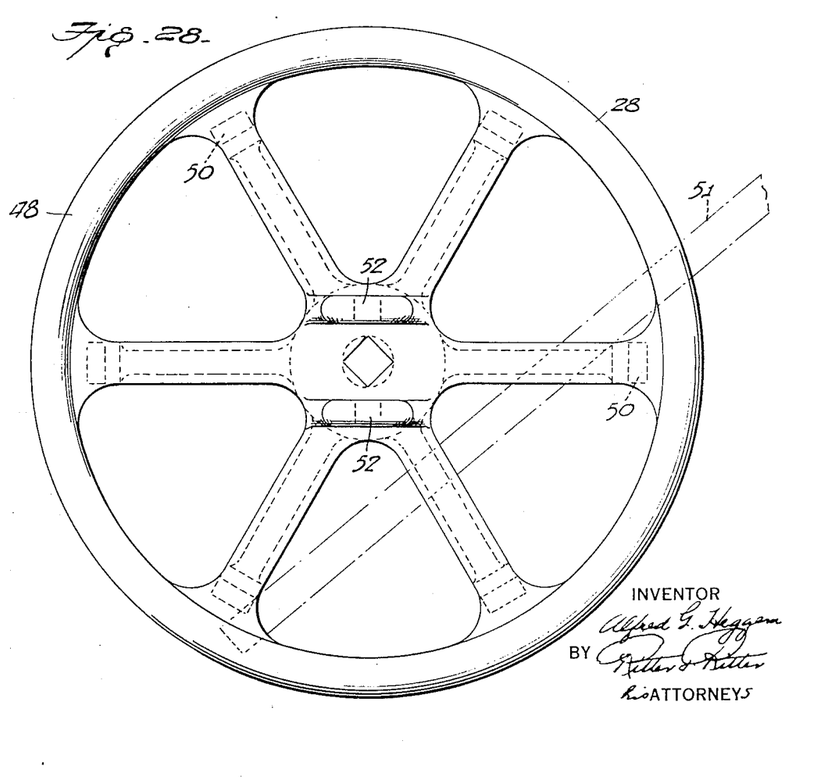
Figure 28 is a plan view of the handwheel, a removable lever for operating the same being shown in dotted lines.

The handwheel 28 by which the valve stem is rotated is preferably formed with a circular rim 48 and with arms or ribs 49 which are widened at their outer ends so as to be offset from the plane of the rim, the peripheral ends of the ribs being hooked or recessed, as indicated at 50, to receive a rope or chain, whereby the hand wheel may be operated after the fashion of a pulley or tiller wheel to actuate the valve stem 26 from a remote station. These ribs also provide abutments for cooperating with a removable bar, as indicated at 51 in Figs. 27 and 28, to facilitate operation of the handwheel by an increased leverage. The handwheel 28 is preferably provided on its outer side at the hub with a pair of spaced lugs 52 provided with alined perforations to receive a bolt. As shown in Figure 27 the lugs 52 provide means for attaching a universal joint device 53 to the handwheel. A pipe or stem 53 secured to one of the members of the universal joint thus may be utilized as a convenient means for actuating the valve handwheel from a distance.

Figure 1:
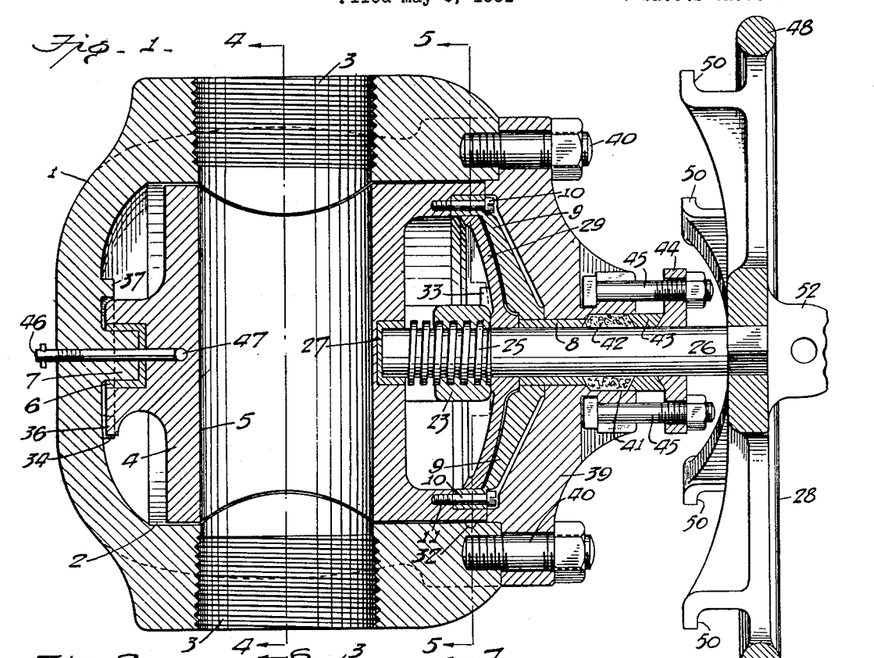
Figure 1 is a longitudinal central section of a valve embodying the invention, the parts being in open position.
Figure 2:
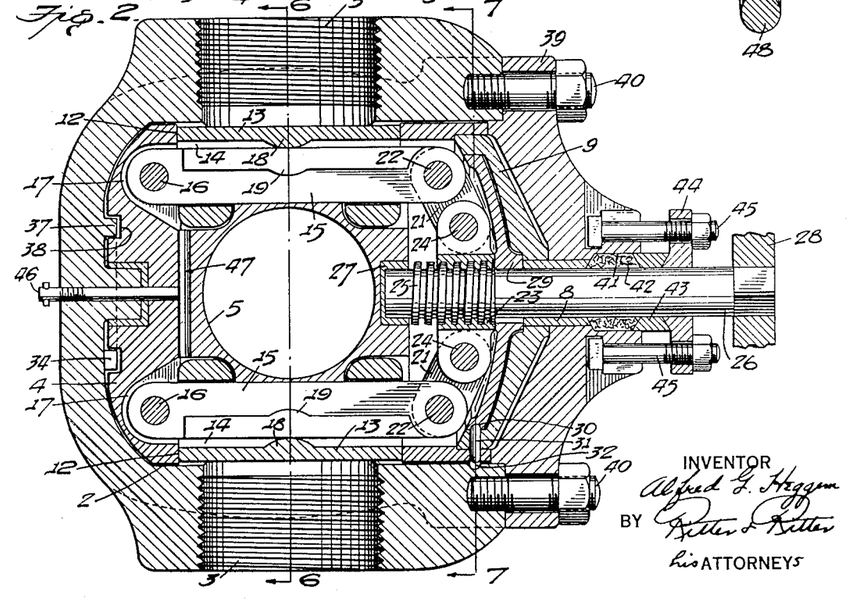
Figure 2 is a view similar to Figure 1, but showing the valve core in closed position and the valve plates in the positions they occupy just prior to being seated in fully closed position against the valve body.
Figure 3:
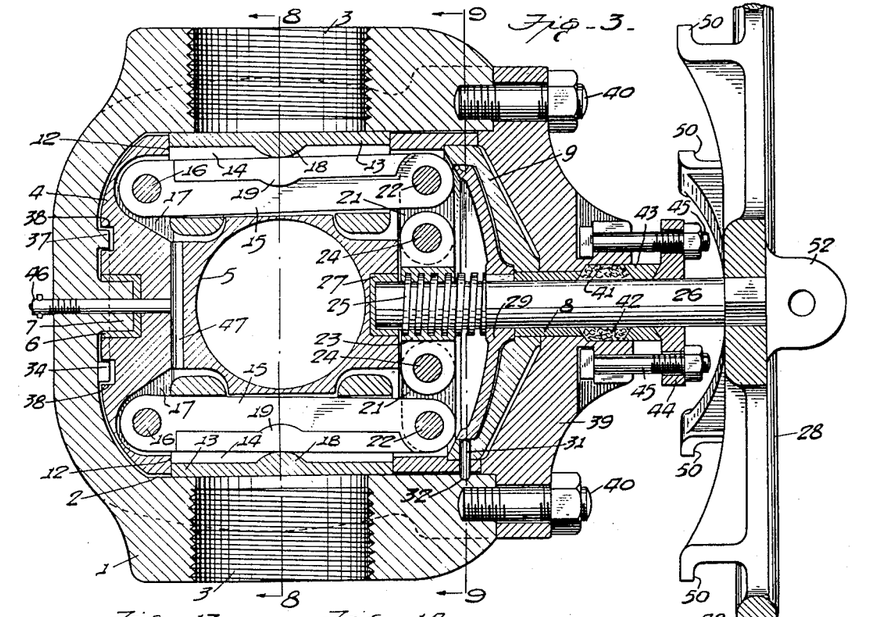
Figure 3 is a longitudinal section of the valve illustrating the positions assumed by the parts when the valve is fully closed.
Figure 5:
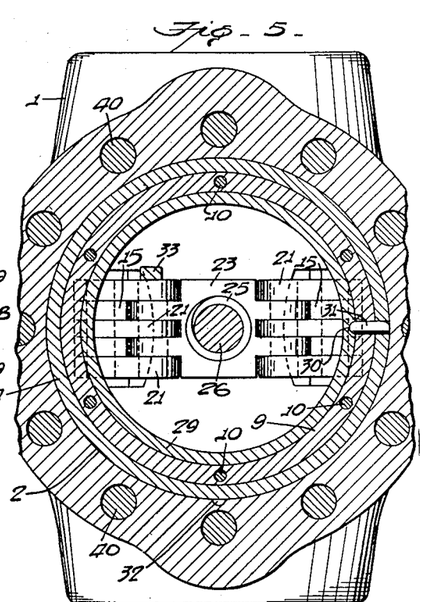
Figure 5 is a sectional view on the line 5—5, Figure 1.
Figure 6:
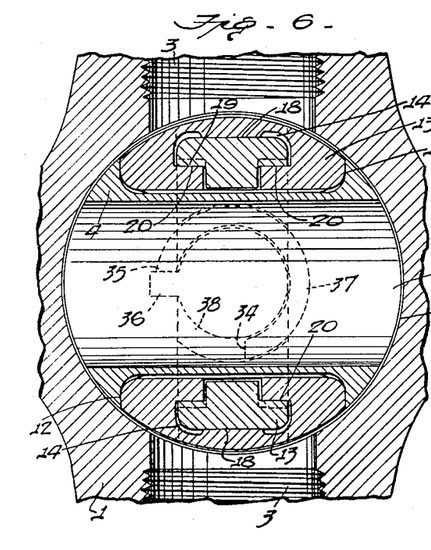
Figure 6 is a sectional view on the line 6—6, Figure 2.
Figure 7:
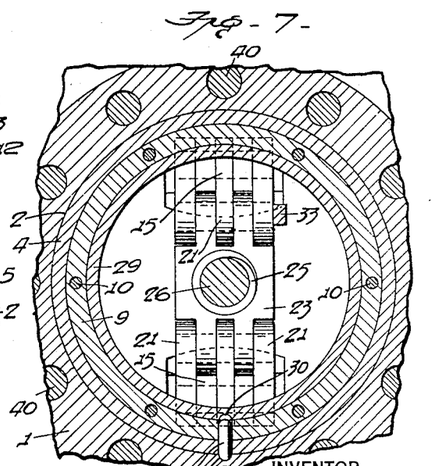
Figure 7 is a sectional view on the line 7—7, Figure 2.

The operation of the construction heretofore described is as follows: Assuming the valve to be open, as shown in Figures 1, 3 and 5, clockwise rotation of the handwheel 28 causes a corresponding rotation of the valve stem 26 and the lock disk 29 secured thereto. As at the beginning of this clockwise or valve closing rotation of the valve stem the detent 31 projects into the notch or recess 30 of the lock disk 29 (see Fig. 5), the lock disk, the valve core 4 and the core cover 9 are all caused to rotate with the valve stem until the stop lug 36 with which the valve core is provided at its inner end comes into contact with the stop lug 35 on the interior of the valve body 1 after the valve core has made a quarter turn. The parts are then in the position illustrated in Figures 2, 6 and 7, the passage 5 through the valve core extending transversely with respect to the axis of the fluid openings of the valve body and the valve plates 13 being centered over the respective openings 3 in readiness to be forced into sealing contact with the valve body so as to prevent the passage of fluid through the valve. In this position of the parts it will be noted (see Figures 6 and 7) that there is a slight clearance between the valve plates and the valve body and that the detent receiving recess 32 in the valve body is in alinement with the detent 31. A continuation of the clockwise rotation of the valve stem 26 causes the lock disk 29 to force the detent 31 out of the notch or recess 30 and into the recess 32 of the valve body 1. By this means the lock disk 29 and the valve stem are released from the valve core 4 and are free to continue their clockwise rotation notwithstanding that rotation of the core in that direction is prevented by the engagement of the stop lugs 35 and 36. At this time the stop lug 33 is back of the valve nut 23 (see Fig. 7) so that the clockwise or closing rotation of the valve stem carries said lug away from the nut. As the closing rotation of the valve stem 26 continues the stop lug 33 approaches the valve nut on the opposite side of the axis of the stem, but during this interval the threads 25 on the valve stem have caused the nut 23 to travel inwardly away from the lock disk 29 to such an extent that the stop lug 33 clears the valve nut so as to permit the lock disk and valve stem to continue their clockwise rotation with respect to the valve core 4 and valve body 1. During this relative rotation of the stem and lock disk with respect to the core the latter and also the valve plates 13, beams or levers 15, links 21, and the nut 23 connected thereto are prevented from turning in either direction by the detent 31. The inward travel of the valve nut 23 causes the toggle links 21 to rock the valve plate levers outwardly on their pivot pins 16 thus forcing the valve plates 13 into firm and intimate contact with the valve body 1 so as to seal the fluid openings 3 thereof. When in fully closed position the parts are in the relation shown in Figure 3. It will be understood that by adopting a suitable pitch for the threads of the valve stem and cooperating nut the valve stem may make any number of revolutions in the operation of forcing the valve plates 13 to sealing contact against the valve body, thus enabling the valve plates to be effectively seated against extremely high pressures.

Figure 4:
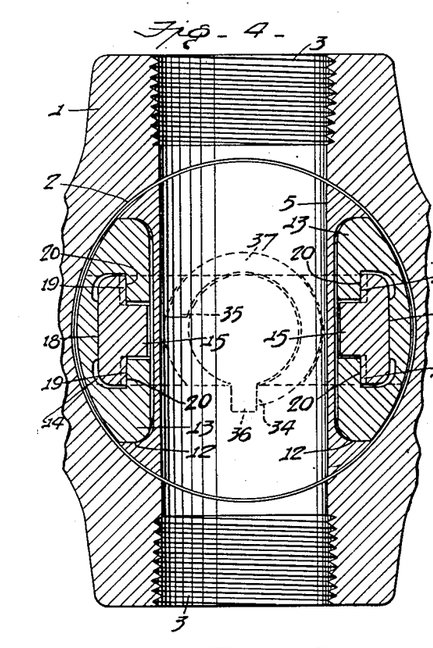
Figure 4 is a sectional view on the line 4—4, Figure 1.
Figure 8:
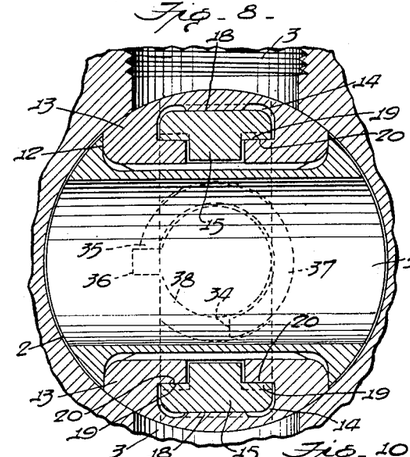
Figure 8 is a sectional view on the line 8—8, Figure 3.
Figure 9:
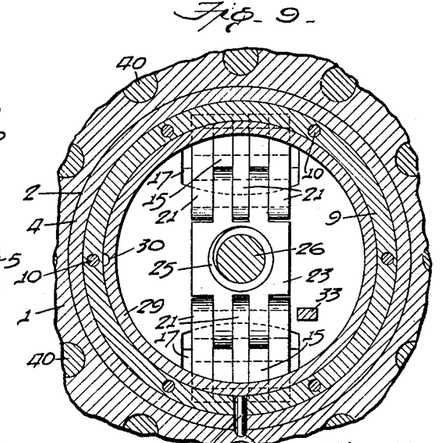
Figure 9 is a sectional view on the line 9—9, Figure 3.
Figure 10:
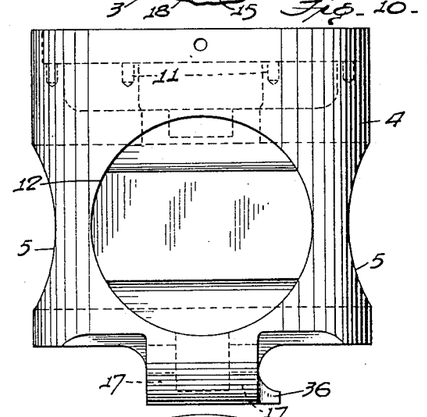
Figure 10 is a detail elevational view of the valve plug or core, looking toward the valve plate receiving recess therein.
Figure 11:
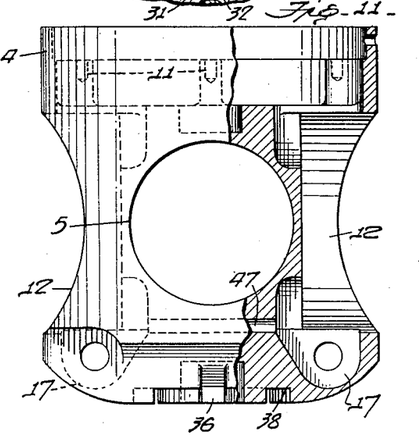
Figure 11 is a view of the valve core, partly in elevation and partly in vertical central section.
Figure 12:
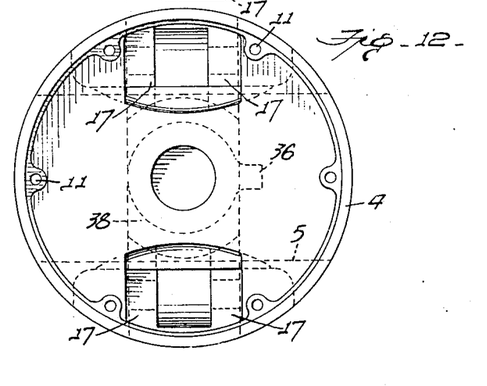
Figure 12 is an end view of the valve core.
Figures 13, 14:
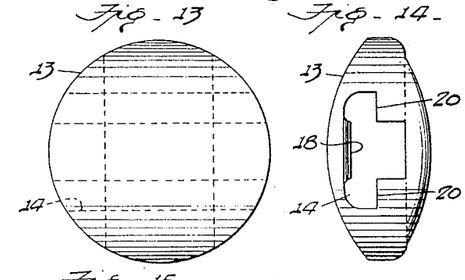
Figures 13, 14 and 15 are detail elevational views of one of the valve plates.
Figure 15:
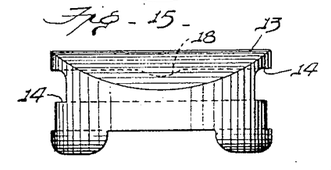
Figure 16:
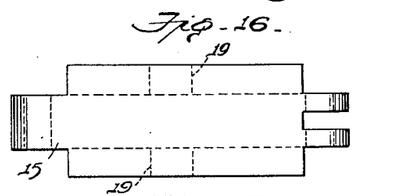
Figures 16 and 17 are detail elevational views of the beams or levers for actuating the valve plates.
Figure 17:
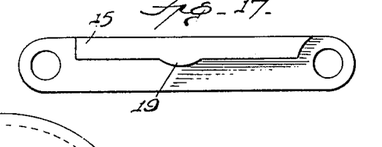
Figure 18:
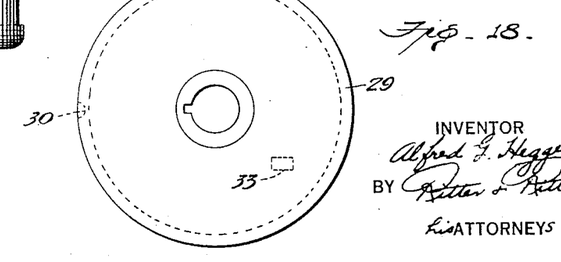
Figure 18 is a detail plan view of the lock disk mounted on the valve stem.

The parts being in closed position, as illustrated in Figures 3, 8 and 9, the valve is opened by turning the handwheel in a counter clockwise direction. As this movement is communicated to the valve stem 26 the nut 23 is caused to move outwardly toward the lock disk 29. This movement of the valve nut, acting through the links 21 connected thereto, causes the valve beams or levers 15 to rock inwardly upon their pivot pins 16 and thereby retract the valve plates 13 inwardly toward the axis of the core 4 until they are freed from contact with the valve body. The retraction of the valve plates is positively effected by the engagement of the curved lugs 19 of the levers 15 with the neighboring portions 20 of the respective valve plates, as shown in Figure 8. When the valve stem 26 has rotated counterclockwise to such an extent that the stop lug 33 on the lock disk 29 comes into contact with the valve nut 23, the detent recess 30 of the lock disk 29 is opposite the detent 31 (see Fig. 7) so that an opening rotation of the valve core 4 with respect to the valve body 1 results in forcing the detent from the notch 32 in the valve body into the recess 30 of the lock disk. The rotation of the valve core with respect to the valve body necessary to shift the detent 31 so as to permit the core 4 to perform a closing rotation is accomplished by the engagement of the lug 33 of the lock disk with the valve nut. This engagement causes the valve nut to rotate with the lock disk 29 and valve stem 26 and, through links 21, levers 15 and valve plates 13, causes a corresponding opening rotation of the valve core 4. This opening rotation of the core continues until its stop lug 36 comes into contact with the stop 34 of the valve body, when the valve is fully open as shown in Figure 4. The stops 34 and 35 which cooperate with the stop 36 of the valve core are so related that the fluid passage through the core is in axial alinement with the openings 3 in the valve body when the valve is open and extends transversely to the axis of the openings 3 when the valve is closed.

Figures 19, 20, 21:
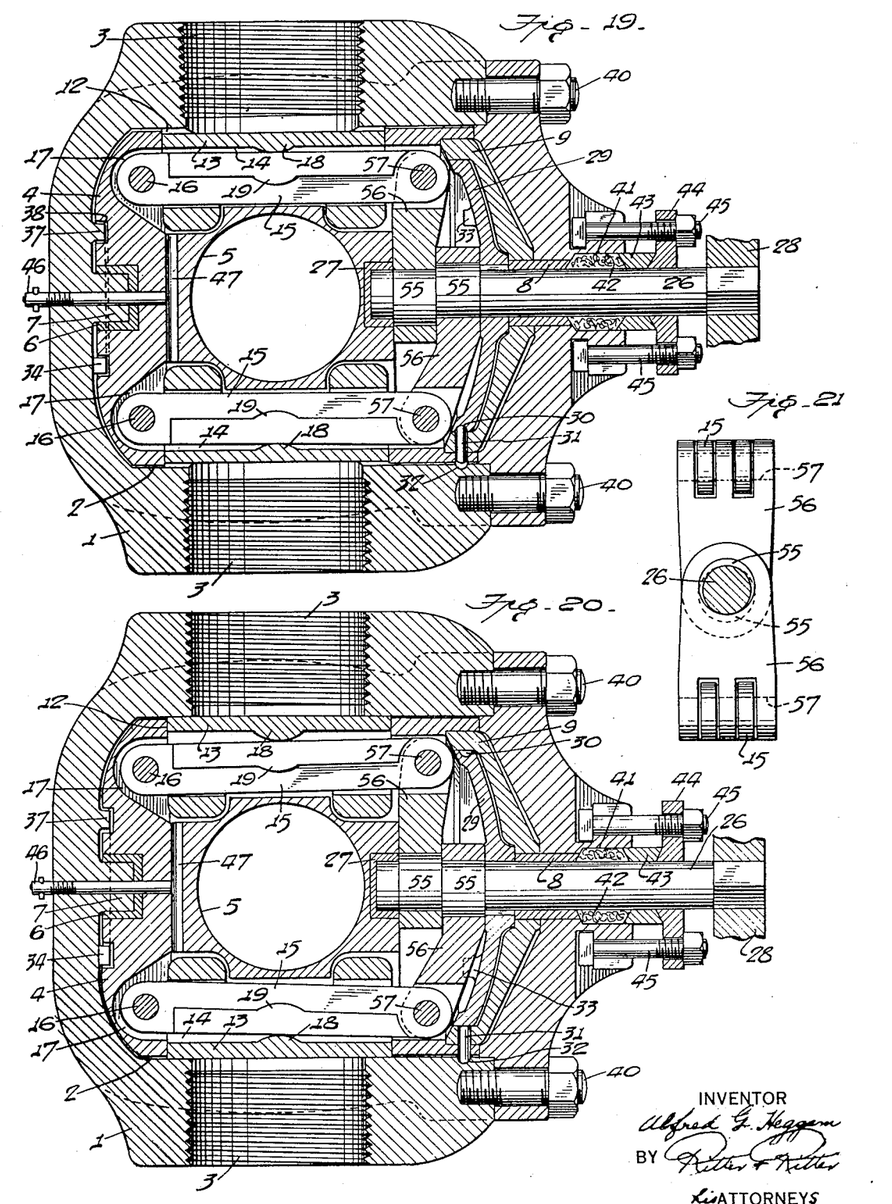
Figure 19 is a longitudinal sectional view corresponding to Figure 2 but illustrating a modified form of the invention.
Figure 20 is a longitudinal sectional view of the form of construction illustrated in Figure 19, the valve being fully closed.
Figure 21 is a detail view, partly in plan and partly in section, showing the relation of the cams and levers employed in the modified construction for actuating the valve plates.

In a modified form of the invention shown in Figures 19 to 21 inclusive the valve stem 26, instead of being provided with screw threads for actuating a travelling nut to effect the sealing contact and retraction of the valve plates 13, is provided with a plurality of eccentrics 55 each of which cooperates with a corresponding link 56, the links being respectively connected to the valve beams or levers 15 by means of pivot pins 57. The other features of construction embodied in this modified form of the invention are the same as those heretofore described and accordingly have been indicated by corresponding reference numerals. This modified form of valve operates in a manner similar to the one employing the nut and screw, with the exception that the outward or valve closing movement of the valve plates 13 with respect to the valve core 4 is effected by 180° rotation of the valve stem 26 after the valve core has reached open position.

Figure 25:
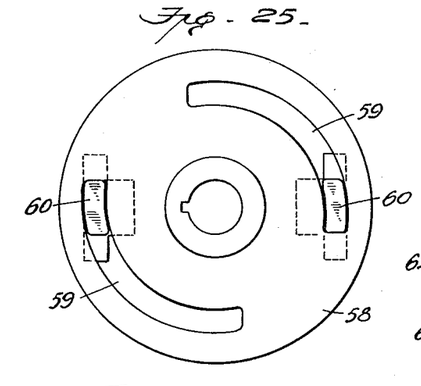
Figure 25 is a detail plan view illustrating another means for actuating the valve plates.
Figure 26:
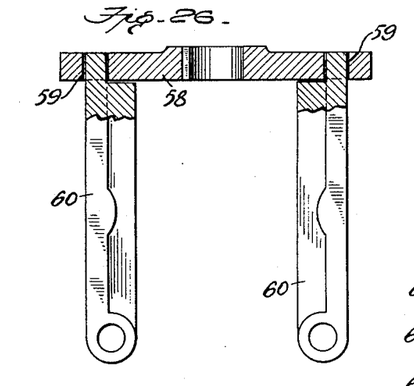
Figure 26 is a view, partly in elevation and partly in section, of the construction shown in Figure 25.

Another form of cam or eccentric means for actuating the beams or pivoted levers by which the valve plates 13 are controlled is illustrated in Figures 25 and 26. In this construction a cam plate 58 which is adapted to be rigidly keyed to the valve stem 26 beneath the locking disk 29 is employed. This plate is formed with oppositely arranged slots 59 which receive the upper ends of valve levers or beams 60. The beams 60 are pivoted at their lower ends to the valve core 4 and cooperate with the respective valve plates 13 in the manner heretofore described.

Figure 22:
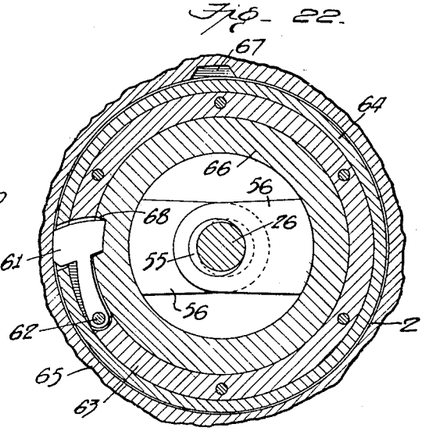
Figure 22 is a sectional view corresponding to Figure 5, but showing a modified form of detent for locking the valve core to the lock disk, the parts being shown in the positions they occupy when the valve is fully open.
Figure 23:
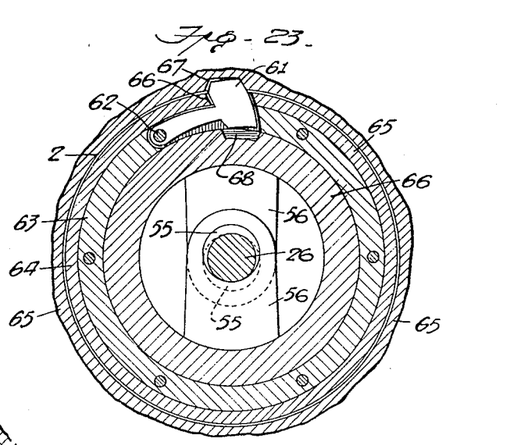
Figure 23 is a view corresponding to Figure 7 but illustrating the modified construction shown in Figure 22, the parts being in the positions they occupy just prior to the seating of the valve plates against the valve body.
Figure 24:
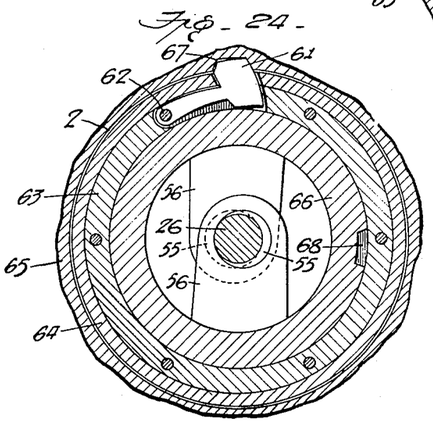
Figure 24 is a view corresponding to Figure 9 but illustrating the modified construction shown in Figures 22 and 23, the parts being in the relations they assume when the valve is fully closed.

Figures 22, 23 and 24 illustrate a modified form of the invention employing a pivoted detent 61 to perform the functions of the sliding detent 31 of the construction heretofore described. The detent is pivotally mounted by means of a pivot pin 62 on a core cover 63. The core cover 63, the valve core 64, the valve body 65 and the lock disk 66 correspond respectively in form and function to the core cover 9, valve core 4, valve body 1 and lock disk 29 heretofore described, except that said parts are suitably formed to accommodate the pivoted detent 61, the recess 67 corresponding to the detent receiving recess 32 of the valve body and the recess 68 corresponding to the detent receiving recess 30 of the lock disk 29. In this form of construction the means illustrated for actuating the valve plates is like that disclosed in Figures 19 to 21 inclusive, that is to say, the valve stem 26 is provided with eccentrics 55 cooperating with links 56 which are pivotally connected to the respective valve beams or levers 15. In the modified construction shown in Figures 20, 22, 23 and 24, as in the constructions heretofore described, the lock disk and valve core are locked together when the valve is in open position, and the valve core and valve body are locked together when the valve is closed. The mode of operation of this form of the device is similar to that already explained.

I claim:

1. A valve involving a valve body having an inlet opening and an outlet opening and a chamber communicating with said openings, and means extending into said chamber and rotatable with respect to said body for controlling the flow of fluid through said openings, said means including a rotatable valve core having a single passage therethrough, a plurality of valve plates carried by said core and movable therewith and disposed on opposite sides of said passage, said valve plates being respectively adapted to close said openings of the valve body and being movable toward and from the axis of rotation of said core, a stem rotatable with respect to said core, and a single detent means controlled by the rotation of said stem, said detent means being adapted to cause said core to be rotated by said stem and being adapted to lock said core to the valve body.

2. A valve involving a valve body having an inlet opening and an outlet opening and a chamber communicating with said openings, and means extending into said chamber and rotatable with respect to said body for controlling the flow of fluid through said openings, said means including a valve core having a single passage therethrough, a plurality of valve plates carried by said core and respectively adapted to close said openings of the valve body, means including a rotatable stem for moving said valve plates with respect to said core to open said openings, said stem being rotatable with respect to said core, and a single detent means responsive to the rotation of said stem for causing said core to be rotated by said stem and for locking said core to the valve body during rotation of said stem independent of said core.

3. A valve involving a valve body having an inlet opening and an outlet opening and a chamber communicating with said openings, and means extending into said chamber and rotatable with respect to said body for controlling the flow of fluid through said openings, said means including a valve core having a single passage therethrough, a plurality of valve plates carried by the core and movable therewith, said valve plates being movable radially of the core and being respectively adapted to close said openings of the valve body, a stem rotatable with respect to the core, cooperating stops on said valve body and core for limiting the opening and closing rotations of the core, means actuated by said stem for moving the valve plates radially of the core to open said openings of the valve body, and a single means controlled by the movement of said stem for releasably locking said core alternatively to said stem and the valve body, said detent means serving to lock said core to the valve body when said core is in closed position.

4. A valve involving a valve body having an inlet opening and an outlet opening and a chamber communicating with said openings, said openings being in axial alinement, a rotatable valve core within said chamber, said core having a single passage therethrough which is in axial alinement with said openings when the valve is open and said core being formed with recesses on opposite sides of said passage, a plurality of valve plates respectively positioned in said recesses and movable with respect to the core, a rotatable stem, a core cover through which the stem extends, means movably connected to said stem inwardly of said core cover for moving said valve plates with respect to the core to cause them to open said openings of the valve body, and means for releasably connecting said stem and core to enable the core to be rotated by the stem.

5. A valve involving a valve body having an inlet opening and an outlet opening and a chamber communicating with said openings, a valve core rotatably mounted in said chamber and having a passage permitting the flow of fluid therethrough, a plurality of valve plates carried by the core and movable with respect thereto, said valve plates being respectively adapted to close said openings of the valve body, a rotatable stem journalled at one end to said core, detent means for releasably connecting said stem and core to enable said stem to rotate said core to open position, and means actuated by said stem for moving said valve plates with respect to the core to close said openings of the valve body.

6. A valve involving a valve body having an inlet opening and an outlet opening and a chamber communicating with said openings, a valve core rotatably mounted in said chamber and having a passage permitting the flow of fluid therethrough, said openings and said passage being in axial alinement when the valve is open, a plurality of valve plates carried by the core and movable with respect thereto, a stem rotatable with respect to the core, means movable with respect to said core and said body for releasably connecting the stem to the core to enable the stem to rotate the core to open position, means actuated by the stem for moving the valve plates with respect to the core to cause them to engage the valve body to close said openings, a core cover overlying said last-named means and rigidly secured to the core and through which said stem extends, and a cover plate member secured to the valve body and through which the stem extends, said cover plate member being provided with packing means for cooperating with said stem.

7. A valve involving a valve body having an inlet opening and an outlet opening and a chamber communicating with said openings, a valve core rotatably mounted in said chamber and having a passage permitting the flow of fluid therethrough, a valve stem rotatable with respect to the core, a plurality of valve plates carried by the core and movable with respect thereto, said valve plates being respectively adapted to close said openings of the valve body, a lock disk secured to said stem for rotation therewith, a core cover secured to said core and overlying said lock disk and through which said stem extends, detent means for releasably locking said core to the lock disk to enable said stem and core to rotate simultaneously, means movably connected to said stem and core for actuating said valve plates to cause them to close said openings of the valve body, and a cover plate member secured to the valve body and through which said stem projects.

8. A valve involving a valve body having an inlet opening and an outlet opening and a chamber communicating with said openings, a valve core rotatably mounted in said chamber and having a passage permitting the flow of fluid therethrough, a plurality of valve plates carried by said core and movable with respect thereto, said valve plates being respectively adapted to close said openings of the valve body, a stem rotatable with respect to the core, a lock disk secured to said stem for rotation therewith, detent means for releasably connecting the stem and core to enable the stem to rotate the core, and means for moving said valve plates with respect to the core to cause them to close said openings of the valve body, said lock disk being provided with a stop adapted to engage said last named means, and said last named means including a nut having threaded engagement with said stem.

9. A valve involving a valve body having an inlet opening and an outlet opening and a chamber communicating with said openings, and means extending into said chamber and rotatable with respect to said body for controlling the flow of fluid through said openings, said means including a valve core having a passage permitting the flow of fluid therethrough, a plurality of valve plates carried by said core and movable with respect thereto, said valve plates being respectively adapted to close said openings of the valve body, a stem rotatable with respect to said core, means for releasably coupling said stem to the core to enable the stem to rotate said core, and means actuated by said stem for moving the valve plates with respect to the core to cause them to close said openings of the valve body, said last named means including a plurality of levers pivotally mounted on the core and respectively engaging the valve plates, and cam means operatively interposed between said levers and the stem, said cam means being rotatable by said stem to actuate said levers.

10. A valve involving a valve body having an inlet opening and an outlet opening and a chamber communicating with said openings, and means extending into said chamber and rotatable with respect to said body for controlling the flow of fluid through said openings, said means including a valve core having a passage permitting the flow of fluid therethrough, a plurality of valve plates carried by said core and movable therewith, said valve plates being respectively adapted to close said openings of the valve body, a stem rotatable with respect to the core, means actuated by the movement of said stem for causing the core to rotate with the stem, a plurality of eccentrics carried by the stem and rotatable therewith, links respectively cooperating with said eccentrics, and a plurality of levers respectively pivoted to said links and to said core, said levers respectively engaging said valve plates for moving the latter with respect to said core to close said openings of the valve body.

11. A valve involving a valve body having an inlet opening and an outlet opening and a chamber communicating with said openings, and means extending into said chamber and rotatable with respect to said body for controlling the flow of fluid through said openings, said means including a valve core having a passage permitting the flow of fluid therethrough, a plurality of valve plates carried by said core and movable with respect thereto, said valve plates being respectively adapted to close said openings of the valve body, a stem rotatable with respect to the core, means actuated by said stem for moving the valve plates with respect to the core to cause them to close said openings of the valve body, a lock disk secured to said stem so as to be rotatable therewith, and a pivoted detent movable with said core for alternatively locking the latter to said lock disk and the valve body, said detent being controlled by the movement of said stem and said lock disk and valve body being respectively recessed for reception of said detent.

12. A valve involving a valve body having an inlet opening and an outlet opening and a chamber communicating with said openings, and means rotatable with respect to said body for controlling the flow of fluid through said openings, said means including a rotatable member journalled on the valve body and having a passage permitting the flow of fluid, a valve plate carried by said rotatable member and movable radially with respect thereto, said valve plate being adapted to close one of said openings of the valve body, a stem having its inner end journalled to the upper portion of said rotatable member, means actuated by said stem for moving the valve plate radially to close one of said openings of the valve body, detent means controlled by the movement of said stem for releasably locking said rotatable member to said stem during the opening movement of said rotatable member, stop means fixed with respect to the valve body for limiting closing rotation of the rotatable member, and means independent of said valve plate for limiting the closing rotation of the stem.

13. A valve involving a valve body having an inlet opening and an outlet opening and a chamber communicating with said openings, a member rotatably mounted in said chamber and having a passage permitting the flow of fluid, a valve plate carried by said rotatable member and movable radially with respect thereto, said valve plate being adapted to close one of said openings of the valve body, a stem having its inner end journalled to the upper portion of said rotatable member, means for releasably connecting said stem and rotatable member to enable the stem to actuate said rotatable member, means for moving said valve plate with respect to the rotatable member to cause said plate to close one of said openings of the valve body, and cooperating stop means respectively rotatable with said stem and rotatable member for limiting closing rotation of said stem with respect to said rotatable member.

14. A valve involving a valve body having an inlet opening and an outlet opening and a chamber communicating with said openings, and means rotatable with respect to said body for controlling the flow of fluid through said openings, said means including a rotatable member having a passage permitting the flow of fluid, a valve plate carried by said rotatable member and movable with respect thereto, said valve plate being adapted to close one of said openings of the valve body, a stem rotatable with respect to said rotatable member, means movable by said stem for causing rotation of said rotatable member, an eccentric carried by the stem and rotatable therewith, a link cooperating with said eccentric, and a lever cooperating with said link and said rotatable member, said lever being movable with respect to said link and rotatable member and engaging said valve plate for moving the latter to close one of said openings of the valve body.

15. A valve involving a valve body having an inlet opening and an outlet opening and a chamber communicating with said openings, means rotatable with respect to said body for controlling the flow of fluid through said openings, said means including a rotatable member having a passage permitting the flow of fluid, a valve plate carried by said rotatable member and movable with respect thereto, said valve plate being adapted to close one of said openings of the valve body, a stem rotatable with respect to said rotatable member, means rigidly connected to said stem for moving said rotatable member to open position, means actuated by the movement of said stem for causing rotation of said rotatable member to closed position, an eccentric carried by the stem and rotatable therewith, a link cooperating with said eccentric, and a lever movably engaging said link and rotatable member and engaging said valve plate for moving the latter to close one of said openings of the valve body.

16. A valve involving a valve body having an inlet opening and an outlet opening and a chamber communicating with said openings, and means rotatable with respect to said body for controlling the flow of fluid through said openings, said means including a rotatable member having a passage permitting the flow of fluid, a valve plate carried by said rotatable member and movable radially with respect thereto, said valve plate being adapted to close one of said openings of the valve body, a stem rotatable with respect to said rotatable member, means for releasably connecting said stem to said rotatable member, a lever engaging said valve plate intermediate of its ends, said lever having a pivotal point fixed with relation to said rotatable member, and means operatively interposed between said lever and said stem for actuating said lever to withdraw said valve plate from contact with said body.

17. A valve involving a valve body having an inlet opening and an outlet opening and a chamber communicating with said openings, and means rotatable with respect to said body for controlling the flow of fluid through said openings, said means including a rotatable member having a passage permitting the flow of fluid, a valve plate carried by said rotatable member and radially movable with respect thereto, said valve plate being adapted to close one of said openings of the valve body, a stem rotatable with respect to said rotatable member, releasable means for causing said stem to actuate said rotatable member, an eccentric carried by the stem and rotatable therewith, a link cooperating with said eccentric and a lever cooperating with said link and engaging said valve plate for moving the latter to close one of said openings of the valve body.

18. A valve involving a valve body having an inlet opening and an outlet opening and a chamber communicating with said openings, and means rotatable with respect to said body for controlling the flow of fluid through said openings, said means including a rotatable member having a passage permitting the flow of fluid, a valve plate carried by said rotatable member and radially movable with respect thereto, said valve plate being adapted to close one of said openings of the valve body and being provided with a slot formed between radially spaced walls, a stem rotatable with respect to said rotatable member, means movable by said stem for causing rotation of said rotatable member, an eccentric carried by the stem and rotatable therewith, a link cooperating with said eccentric, and a lever actuated by said link and extending into said slot of the valve plate.

19. A valve involving a valve body having an inlet opening and an outlet opening and a chamber communicating with said openings, and means rotatable with respect to said body for controlling the flow of fluid through said openings, said means including a valve plate adapted to close one of said openings of the valve body, a rotatable stem, an eccentric carried by the stem and rotatable therewith, a link cooperating with said eccentric, and a lever actuated by said link for moving said valve plate to close one of said openings of the valve body and for withdrawing said plate from sealing contact with said body.

20. A valve involving a valve body having an inlet opening and an outlet opening and a chamber communicating with said openings, and means rotatable with respect to said body for controlling the flow of fluid through said openings, said means including a core member having a passage permitting flow of fluid, a valve plate carried by said core and movable radially with respect thereto, said valve plate being adapted to close one of the said openings of the valve body, a stem rotatable with respect to said core, means for releasably coupling said stem to said core to enable the stem to rotate said core, a lever movable with respect to said core and engaging said valve plate, and means actuated by said stem to move said lever to cause said plate to close one of said openings of the valve body and to cause said plate to be withdrawn from sealing contact with said body.

21. A valve involving a valve body having an inlet opening and an outlet opening and a chamber communicating with said openings, and means rotatable with respect to said body for controlling the flow of fluid through said openings, said means including a valve plate adapted to close one of said openings of the valve body, a rotatable stem, means actuated by the rotation of said stem for moving said valve plate to and from a position in which it overlaps one of said openings of the valve body, and means actuated by the rotation of said stem for moving said valve plate toward the valve body to close one of said openings of the body, said last-named means including a lever cooperating with said valve plate, and means actuated by the rotation of said stem for moving said lever.

22. A valve involving a valve body having an inlet opening and an outlet opening and a chamber communicating with said openings, and means rotatable with respect to said body for controlling the flow of fluid through said openings, said means including a rotatable stem, a valve plate radially movable with respect to said stem and adapted to close one of said openings of the valve body, a lever cooperating with said valve plate to move the latter radially with respect to said stem, and means actuated by the rotation of said stem for moving said lever toward and from said stem.

23. A valve involving a valve body having an inlet opening and an outlet opening and a chamber communicating with said openings, and means rotatable with respect to said body for controlling the flow of fluid through said openings, said means including a valve stem rotatable with respect to the valve body, a valve plate, said valve plate being radially movable with respect to said stem and said stem being rotatable with respect to said valve plate, means actuated by the rotation of said stem for moving said valve plate to and from a position in which it overlaps one of said openings of the valve body, and means actuated by the rotation of said stem for moving said valve plate radially toward and from the valve body, said last-named means including a lever cooperating with said valve plate.

24. A valve involving a valve body having an inlet opening and an outlet opening and a chamber communicating with said openings and means rotatable with respect to said body for controlling the flow of fluid through said openings, said means including a valve plate adapted to close one of said openings of the valve body, a rotatable stem, means actuated by the rotation of said stem for moving said valve plate to and from a position in which it overlaps one of said openings of the valve body, and means actuated by the rotation of said stem for moving said valve plate toward the valve body to close one of said openings of the body, said last-named means including a lever cooperating with said valve plate, means actuated by the rotation of said stem and engaging said lever at one side of said valve plate for moving said lever, and pivotal means for supporting the opposite end of said lever in fixed relation to the axis of said stem.

25. A valve involving a valve body having an inlet opening and an outlet opening and a chamber communicating with said openings, and means rotatable with respect to said body for controlling the flow of fluid through said openings, said means including a valve plate adapted to close one of said openings of the valve body, a member rotatable within said chamber and upon which said valve plate is mounted with capability of radial movement, a stem rotatable with respect to said body and with respect to said rotatable member, means actuated upon the rotation of said stem with respect to said rotatable member for moving said valve plate radially, latching means movable with said rotatable member and also movable with respect thereto for releasably latching said rotatable member to the stem during an initial portion of the valve closing rotation of the stem, and means fixed with respect to the valve body for cooperating with said latching means to prevent opening rotation of said rotatable member during an initial portion of the opening rotation of said stem.

ALFRED G. HEGGEM.